US009757712B2

(12) United States Patent
Hoyer et al.

(10) Patent No.: US 9,757,712 B2
(45) Date of Patent: Sep. 12, 2017

(54) CATALYST FOR THE OXIDATION OF CO AND HC AT LOW TEMPERATURES

(71) Applicant: UMICORE AG & CO. KG, Hanau-Wolfgang (DE)

(72) Inventors: Ruediger Hoyer, Alzenau-Hoerstein (DE); Fei Wen, Kahl am Main (DE); Elena Mueller, Pfungstadt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 15/029,853

(22) PCT Filed: Oct. 22, 2014

(86) PCT No.: PCT/EP2014/072589
§ 371 (c)(1),
(2) Date: Apr. 15, 2016

(87) PCT Pub. No.: WO2015/059164
PCT Pub. Date: Apr. 30, 2015

(65) Prior Publication Data
US 2016/0236180 A1  Aug. 18, 2016

(30) Foreign Application Priority Data

Oct. 22, 2013  (DE) .................. 10 2013 221 423

(51) Int. Cl.
*B01D 53/94* (2006.01)
*B01J 21/04* (2006.01)
(Continued)

(52) U.S. Cl.
CPC ............ *B01J 23/44* (2013.01); *B01D 53/944* (2013.01); *B01D 53/945* (2013.01); *B01J 23/10* (2013.01);
(Continued)

(58) Field of Classification Search
CPC . B01J 21/04; B01J 21/063; B01J 21/08; B01J 21/10; B01J 21/12; B01J 21/14;
(Continued)

(56) References Cited

U.S. PATENT DOCUMENTS 4,469,816 A * 9/1984 Armor .................. B01J 23/44
502/333
5,128,306 A * 7/1992 Dettling ............... B01D 53/945
423/213.5

(Continued)

FOREIGN PATENT DOCUMENTS

DE  3940758 A1  6/1991
DE  4435073 A1  4/1995
(Continued)

OTHER PUBLICATIONS

International Search Report for PCT/EP2014/072589, dated Feb. 13, 2015 in English and German Language.
(Continued)

*Primary Examiner* — Cam N. Nguyen
(74) *Attorney, Agent, or Firm* — Smith, Gambrell & Russell, LLP

(57) ABSTRACT

The present invention relates to a catalyst for the removal of carbon monoxide and hydrocarbon from the exhaust gas of lean-operated internal combustion engines on a supporting body, which bears platinum and/or palladium on one or more refractory carrier materials and also contains cerium oxide and which, after reductive treatment at 250° C. and after CO adsorption, is characterized by certain peaks in Diffuse Reflectance Infrared Fourier Transform Spectroscopy (DRIFTS), and also relates to the use thereof for removing carbon monoxide and hydrocarbon from the exhaust gas of lean-operated internal combustion engines.

6 Claims, 2 Drawing Sheets

(51) Int. Cl.
| | |
|---|---|
| B01J 21/06 | (2006.01) |
| B01J 21/08 | (2006.01) |
| B01J 21/10 | (2006.01) |
| B01J 21/12 | (2006.01) |
| B01J 21/14 | (2006.01) |
| B01J 21/16 | (2006.01) |
| B01J 23/10 | (2006.01) |
| B01J 23/63 | (2006.01) |
| B01J 29/00 | (2006.01) |
| B01J 23/44 | (2006.01) |
| B01J 37/02 | (2006.01) |
| B01J 35/00 | (2006.01) |
| B01J 37/08 | (2006.01) |

(52) U.S. Cl.
CPC ............ *B01J 23/63* (2013.01); *B01J 35/002* (2013.01); *B01J 37/0234* (2013.01); *B01J 37/0248* (2013.01); B01D 2255/1021 (2013.01); B01D 2255/1023 (2013.01); B01D 2255/2065 (2013.01); B01D 2255/40 (2013.01); B01D 2258/012 (2013.01); B01J 37/0203 (2013.01); B01J 37/0205 (2013.01); B01J 37/0219 (2013.01); B01J 37/08 (2013.01); B01J 2523/00 (2013.01); Y02T 10/22 (2013.01)

(58) Field of Classification Search
CPC ... B01J 21/16; B01J 23/10; B01J 23/63; B01J 29/00; B01D 53/945
USPC ....... 502/304, 326, 327, 332–334, 339, 439, 502/527.12, 527.13; 423/213.5
See application file for complete search history.

(56) References Cited

U.S. PATENT DOCUMENTS

| | | | | |
|---|---|---|---|---|
| 5,171,728 | A * | 12/1992 | Sakurai ................ | B01D 53/864 502/178 |
| 5,179,060 | A * | 1/1993 | Subramanian ....... | B01D 53/945 423/213.5 |
| 5,514,354 | A | 5/1996 | Domesle et al. | |
| 5,744,103 | A | 4/1998 | Yamada et al. | |
| 5,928,981 | A | 7/1999 | Leyrer et al. | |
| 6,254,842 | B1 * | 7/2001 | Hu ........................ | B01D 53/945 423/213.2 |
| 6,342,465 | B1 | 1/2002 | Klein et al. | |
| 6,475,951 | B1 * | 11/2002 | Domesle .............. | B01D 53/945 502/325 |
| 6,709,643 | B1 * | 3/2004 | Ozkan ................. | B01D 53/8628 423/239.1 |
| 6,896,857 | B2 * | 5/2005 | Nakamura ........... | B01D 53/945 423/213.5 |
| 7,313,911 | B2 | 1/2008 | Pfeifer et al. | |
| 8,617,496 | B2 * | 12/2013 | Wei ........................ | B01J 23/63 423/213.2 |
| 8,640,440 | B2 * | 2/2014 | Klingmann .......... | B01D 53/944 422/170 |
| 8,652,429 | B2 * | 2/2014 | Sumiya ................ | B01J 37/0244 423/213.2 |
| 8,667,785 | B2 * | 3/2014 | Blakeman ............ | B01J 35/0006 423/213.5 |
| 8,679,434 | B1 * | 3/2014 | Li ............................ | B01J 23/42 423/213.5 |
| 8,771,624 | B2 * | 7/2014 | Ikeda ....................... | B01J 23/63 423/213.5 |
| 8,828,343 | B2 * | 9/2014 | Liu ...................... | B01D 53/945 423/213.5 |
| 2016/0051930 | A1 | 2/2016 | Hoyer et al. | |

FOREIGN PATENT DOCUMENTS

| | | |
|---|---|---|
| DE | 19614540 A1 | 10/1997 |
| DE | 19753738 A1 | 6/1999 |
| DE | 10308288 A1 | 9/2004 |
| EP | 0427970 A2 | 5/1991 |
| WO | 2013149881 A1 | 10/2013 |

OTHER PUBLICATIONS

Catalysis Today 155 (2010) "The Power of Quantitative Kinetic Studies of Adsorbate Reactivity by Operando FTIR Spectroscopy Carried Out at Chemical Potential Steady-State" F.C. Meunier pp. 164-171.

Catalysis Today 68 (2001) "IR Spectroscopy in Catalysis" J. Ryczkowski pp. 263-381.

* cited by examiner

CATALYST FOR THE OXIDATION OF CO AND HC AT LOW TEMPERATURES

The present invention relates to a catalyst for the removal of carbon monoxide and hydrocarbon from the exhaust gas of lean-operated internal combustion engines, such as diesel engines, at very low temperatures, as well as a method of using said catalyst.

Oxidation catalysts for the removal of the pollutant gases carbon monoxide (CO) and hydrocarbon (HC) from the exhaust gases of diesel and lean-operated internal combustion engines are well-known from the prior art and are predominantly based upon platinum and aluminum oxide. Examples of diesel oxidation catalysts may be found in the patent applications DE 10308288 A1, DE 19614540 A1, DE 19753738 A1, DE 3940758 A1, EP 0427970 A2, and DE 4435073 A1. They use the oxygen contained in large amounts in the diesel exhaust gas to oxidize the said pollutant gases to carbon dioxide ($CO_2$) and water vapor. Cerium oxide-containing catalysts for the oxidation of carbon monoxide and hydrocarbons are described in WO 2013/149881.

As part of the optimization of $CO_2$, the exhaust gas temperatures of future diesel motors will be increasingly colder, making the conversion of HC and CO significantly more difficult. Temperatures in excess of 200° C. are usually only reached in the NEDC cycle during extra-urban driving conditions, and a large part of the conversion must take place at temperatures of <150° C. in order to comply with the emissions limits. This requires catalysts having a CO light-off of T90 (temperature at 90% conversion) <150° C. This is frequently no longer possible with the current diesel oxidation catalysts after they have aged, such that there is an urgent need for improvement.

Surprisingly, it has now been found that diesel oxidation catalysts that contain cerium oxide in addition to platinum and/or palladium have significantly lower light-off temperatures when they display certain peaks in Diffuse Reflectance Infrared Fourier Transform Spectroscopy (DRIFTS) after CO adsorption.

Thus, the present invention relates to a catalyst for the removal of carbon monoxide and hydrocarbon from the exhaust gas of lean-operated internal combustion engines on a supporting body, which (i) bears platinum and/or platinum and palladium on one or more refractory carrier materials, and (ii) also contains cerium oxide, characterized in that, after reductive treatment at 250° C. and after CO adsorption, it exhibits certain peaks in Diffuse Reflectance Infrared Fourier Transform Spectroscopy (DRIFTS) at wavenumbers of 2906 $cm^{-1}$ (±5 $cm^{-1}$), 2879 $cm^{-1}$ (±5 $cm^{-1}$), and 2847 $cm^{-1}$ (±5 $cm^{-1}$) and wherein the ratio of peak heights at 2879 $cm^{-1}$ and 2906 $cm^{-1}$, as well as the ratio of the peak heights at 2847 $cm^{-1}$ and 2906 $cm^{-1}$, are each greater than 0.4.

Usually, the quantity of platinum or platinum and palladium that is supported by the refractory carrier material is 0.5% to 10% by weight—preferably 1 to 5% by weight—each relative to component (i).

In one embodiment of the present invention, component (i) comprises platinum and palladium. In this case, the quantity of palladium, for example, is selected such that a weight ratio of Pt:Pd of 1:1 to 20:1 results.

For the refractory carrier materials of component (i), on which the platinum or the platinum and palladium are supported, all of the materials familiar to the person skilled in the art for such purposes are suitable. Such materials comprise a BET surface of 30 to 250 $m^2/g$—preferably from 100 to 200 $m^2/g$ (specified according to DIN 66132)—and comprise, in particular, aluminum oxide, silicon oxide, magnesium oxide, titanium oxide, cerium oxide, zeolite, and mixtures or mixed oxides thereof.

Aluminum oxide, magnesium/aluminum mixed oxides, and aluminum/silicon mixed oxides are preferred. If aluminum oxide is used, it is particularly preferable that it be stabilized, such as with lanthanum oxide.

Coating of the refractory carriers with platinum or palladium is carried out using known methods, such as according to the incipient wetness method using water-soluble platinum or palladium compounds.

In one embodiment of the present invention, cerium oxide comprises non-doped cerium oxide having a cerium oxide proportion >99% by weight. The BET value (specified according to DIN 66132) with fresh, i.e., unaged cerium oxide, lies, in particular, near values of >90 $m^2/g$.

In another embodiment of the present invention, cerium oxide is present in doped form or as a mixed oxide within, for example, zirconium oxide, aluminum oxide, lanthanum oxide, and/or praseodymium oxide. The proportion of cerium oxide in the doped form or in the mixed oxide is, in particular, 80 to 99% by weight.

The quantity of cerium oxide in the inventive catalyst is, in particular, 50 to 150 g/L, relative to the volume of the supporting body.

The inventive catalyst displays the described DRIFTS peaks, following reductive treatment at 250° C.

This treatment is preferably carried out by means of three 5-second-long fuel pulses having a lambda of 0.95 at 250° C. If the inventive catalyst was exposed to an oxidative atmosphere, such as at temperatures of >400° C., it can be reactivated by means of a reductive treatment. This means that it will again display the DRIFTS peaks at wavenumbers 2906 $cm^{-1}$, 2879 $cm^{-1}$, and 2847 $cm^{-1}$ following the reductive treatment, if they had disappeared following the influence of the oxidative atmosphere.

Diffuse Reflectance Infrared Fourier Transform Spectroscopy (DRIFTS) is thoroughly described in the literature and well known to the person skilled in the art; cf., for example, Catalysis Today 155 (2010) 164-171 and Catalysis Today 68 (2001) 263-381.

In DRIFTS, IR radiation is focused by means of mirrors onto a sample in powdered form of the material to be tested, whereby a superposition of reflection, diffraction, refraction, transmission, and absorption processes is produced through interaction with the sample. A portion of the scattered IR radiation exits the DRIFTS cell and is passed via additional mirrors to a detector. This method makes it possible to examine samples as powders in the cell under nearly realistic conditions and to detect surface complexes of adsorbed species.

According to the present invention, the formation of formate species on the surface of the catalyst samples after reductive treatment at 250° C. and adsorption of CO was observed by means of DRIFTS. In doing so, there were three peaks at wavelengths of 2906 $cm^{-1}$, 2879 $cm^{-1}$, and 2847 $cm^{-1}$, wherein the ratio of peak heights at 2879 $cm^{-1}$ to 2906 $cm^{-1}$ and 2847 $cm^{-1}$ to 2906 $cm^{-1}$ for the inventive catalyst is greater than 0.4.

In one embodiment of the inventive catalyst, it comprises a NOx storage component, which comprises, in particular, an alkali or alkaline earth compound, such as barium oxide or strontium oxide. The NOx storage component is used, in particular, in amounts of 5 to 50 g/L, relative to the volume of the supporting body. In addition, it is generally supported on a high surface area refractive oxide, for which, for example, aluminum oxide, magnesium oxide, and homogeneous magnesium/aluminum mixed oxide can be used.

In addition, the storage component can also be supported on cerium oxide or a cerium mixed oxide.

The inventive catalyst may be obtained in a simple manner by mixing its components and applying this to a supporting body in the form of a washcoat.

Following subsequent reductive treatment at 250° C. and after CO-adsorption, the person skilled in the art can determine by means of routine DRIFTS measurements whether a catalyst displays the claimed peaks with the claimed ratios of peak heights and thus, whether or not it is in accord with the invention. It has been found that the claimed DRIFTS peaks result from the formation of formate species on the catalyst surface and depend in particular upon the cerium oxide used.

As a general rule, catalysts display the claimed peaks with the claimed ratios of the peak heights when, at a constant amount of platinum, the ratio of the amount of cerium oxide to the amount of palladium is large.

All of the known supporting bodies for heterogeneous catalysts are, essentially, suitable as catalytically inert supporting bodies. Monolithic and monolith-like flow honeycombs made of ceramic and metal, as well as particle filter substrates, are preferred, as they are commonly used for the cleaning of diesel motor exhaust gases. Ceramic flow honeycombs and ceramic wall flow filter substrates made of cordierite, aluminum titanate, or silicon carbide are particularly preferred.

The coating of the supporting body with the inventive catalyst is accomplished in a known manner, particularly whereby a coating suspension ("washcoat") containing the components of the inventive catalyst or the precursors thereof is applied to the supporting body and subsequently dried and calcined. The application can be accomplished according to known dipping, sucking, and/or pumping processes.

A washcoat for coating a supporting body with the inventive catalyst preferably comprises an aqueous suspension which, in addition to any necessary auxiliary materials, contains a refractory carrier material coated with platinum and/or palladium (component (i)), cerium oxide (component (ii)), and a NOx storage component, as the case may be.

The inventive catalyst can be used in a known manner alone or as a component of a catalyst system for the removal of carbon monoxide and hydrocarbon from the exhaust gas of lean-operated internal combustion engines.

The present invention thus relates as well to a method for the removal of carbon monoxide and hydrocarbon from the exhaust gas of lean-operated internal combustion engines, characterized in that the exhaust is passed over an inventive catalyst.

The catalysts examined in the following examples are comprised of different components. These components were each processed into an aqueous coating dispersion, with the flow honeycomb made of cordierite with a cell depth of 62 cm$^{-2}$ (quantity of flow channels of the honeycomb per cross-sectional area) being coated with the help of a dipping process. The coated honeycombs were dried and subsequently calcined at 500° C. for a period of 2 hours in air. The CO light-off behavior of the finished catalysts thus obtained was examined after artificial aging in a laboratory model gas system.

For purposes of aging, the catalysts were stored at a temperature of 800° C. for a period of 16 hours in a hydrothermal atmosphere, i.e., 10% by volume $O_2$ and 10% by volume $H_2O$ in oxygen.

Test Conditions:

The CO light-off behavior of the thermally pre-treated ("aged") catalysts was determined in a laboratory model gas system from the following examples and comparative examples.

Prior to the testing of the catalysts, they were subjected to a thermal pre-treatment at 800° C. in 10% by volume $O_2$ and 10% by volume $H_2O$ in $N_2$ for 16 h.

To test the CO conversion activity, the test specimens were installed sequentially in the reactor of the model gas system and subjected to the following test procedure:

1. To represent typical diesel conditions in which the catalyst is in contact with only lean exhaust gas, the specimens were heated in the exhaust mixture "conditioning 1," which has a heating rate of 7.5° C. per minute, to 500° C., and then again cooled to 80° C.

2. Subsequently, to determine the CO light-off behavior, the catalysts were heated in the exhaust gas composition for the light-off, which has a heating rate of 7.5° C. per minute, to 550° C. The CO conversion was calculated according to the formula $$\text{CO conversion [\%]} = 100\% \times (c(CO)_{in} - c(CO)_{out})/c(CO)_{in}, \text{ where}$$

$c(CO)_{in}$ is the concentration of CO at the catalyst inflow, and $c(CO)_{out}$ is the concentration of CO at the catalyst outflow 3. To represent the CO light-off behavior, the specimens were examined three times following "conditioning 2," hereafter also referred to as reductive treatment, which consists of a 200-second-long "lean" phase and a subsequent 5-second-long "rich" phase.

4. After cooling to 80° C., the CO conversion was again determined according to the above-described light-off procedure.

|  |  | Conditioning 2 |  | Light- |
|---|---|---|---|---|
| Component | Conditioning 1 | Lean phase | Rich phase | off |
| NO [ppm] | 50 | 25 | 25 | 50 |
| $NO_2$ [ppm] | 50 | 25 | 25 | 50 |
| $O_2$ [vol %] | 5 | 7 | 2 | 5 |
| CO [ppm] | 1000 | 1000 | 4 | 1000 |
| HC [ppm] ($C_3H_6/C_3H_8$ = 1/1) | 150 | 150 | 800 | 150 |
| $CO_2$ [vol %] | 6 | 6 | 6 | 6 |
| $H_2O$ [vol %] | 6.6 | 6.6 | 6.6 | 6.6 |
| Balance $N_2$ | remainder | remainder | remainder | remainder |
| Space velocity [1/h] | 50000 | 36000 | 48000 | 50000 |
| Duration [s] | 300 | 200 | 5 |  |

For the DRIFTS measurements, the catalyst samples were first milled. In all measurements, $N_2$ was used as an inert gas, wherein the total volume flow through the DRIFTS cell was constant at 6 L h$^{-1}$. For reductive pre-treatment, the milled catalyst sample was first rinsed in the DRIFTS cell for 2 minutes at 25° C. with 10% CO, then treated for 10 minutes at 250° C. with 10% $H_2$, and the cell subsequently dosed for 6 minutes at 25° C. with 10% CO, and finally rinsed with $N_2$ again for 6 minutes at 25° C. The spectrum (resolution: 4 cm$^{-1}$, scan time: 12 s, KBr as background) following step 4 was recorded as a result. For oxidative pre-treatment, $H_2$ was replaced with $O_2$.

Reductive Pre-Treatment:

| Step | Gas | T, ° C. | t, min |
|---|---|---|---|
| 1 | 10% CO in $N_2$ | 25 | 2 |
| 2 | 10% $H_2$ in $N_2$ | 250 | 10 |
| 3 | 10% CO in $N_2$ | 25 | 6 |
| 4 | $N_2$ | 25 | 6 |

Oxidative Pre-Treatment:

| Step | Gas | T, ° C. | t, min |
|---|---|---|---|
| 1 | 10% CO in $N_2$ | 25 | 2 |
| 2 | 10% O in $N_2$ | 250 | 10 |
| 3 | 10% CO in $N_2$ | 25 | 6 |
| 4 | $N_2$ | 25 | 6 |

EXAMPLE 1 (SAMPLE CATALYST K1)

To produce the sample catalyst K1, lanthanum-stabilized aluminum oxide was mixed in water to form a suspension with 3% by weight $La_2O_3$, relative to the total weight of the mixed oxide, which had been previously coated with platinum from platinum tetraamine acetate in the "incipient wetness" process. To this, palladium in the form of palladium nitrate was injected and finally mixed with 150 g/L, relative to the catalyst volume, of a high surface area cerium oxide having a cerium oxide content of 100% by weight. Subsequently, a flow honeycomb made of cordierite with a cell depth of 62 $cm^{-1}$ was coated with this suspension by means of a dipping process. The honeycomb was then dried and calcined at 500° C. for a period of 2 hours in air. The catalyst thus produced contained 3571.5 $g/m^3$ (100 $g/ft^3$) platinum and 714.3 $g/m^3$ (20 $g/ft^3$) palladium.

COMPARATIVE EXAMPLE 1 (COMPARATIVE CATALYST VK1)

The La-stabilized aluminum oxide coated with Pt was applied to a honeycomb according to the procedure described in example 1. The comparative catalyst VK1 thus produced contained 3571.5 $g/m^3$ (100 $g/cft^3$) platinum.

EXAMPLE 2 (SAMPLE CATALYST K2)

In order to produce a Pt-based oxidation catalyst, a commercially available high surface area cerium oxide with a cerium oxide content of 100% by weight and lanthanum-stabilized aluminum oxide with 3% by weight $La_2O_3$, relative to the total weight of the mixed oxide—which was previously coated with platinum from platinum tetraamine acetate in the "incipient wetness" process—was mixed with water to form a suspension. Palladium as palladium nitrate was additionally injected into this suspension. Subsequently, a flow honeycomb made of cordierite with a cell depth of 62 $cm^{-1}$ was coated with this suspension by means of a dipping process. The honeycomb was then dried and calcined at 500° C. for a period of 2 hours in air. The catalyst K2 thus obtained contained 178.57 $g/m^3$ (50 $g/ft^3$) platinum and 107.14 $g/m^3$ (3 $g/ft^3$) palladium.

EXAMPLE 3 (SAMPLE CATALYST K3)

Analogously to example 2, a catalyst was produced which, instead of the cerium oxide with a cerium oxide content of 100% by weight, contained a commercially available doped cerium oxide with a cerium oxide content of 85% by weight. The cerium oxide contained as stabilizers 5% by weight each of lanthanum oxide, praseodymium oxide, and aluminum oxide.

COMPARATIVE EXAMPLE VK2

Analogously to example 2, an additional catalyst was produced which contained an additional commercially available cerium oxide with a cerium oxide content of 85% by weight and which was stabilized with 5% by weight each of lanthanum oxide, praseodymium oxide, and silicon oxide.

BRIEF DESCRIPTION OF DRAWINGS

FIG. 1 shows the CO conversion of sample catalyst K1 and comparative catalyst VK1 as a function of the temperature after pre-treatment in oxidizing atmosphere (conditioning 1; thin line) at temperatures up to 500° C. and after pre-treatment with 3× reducing atmosphere (conditioning 2; thick line) for 5 s at 250° C. While the CO conversion behavior of VK1 is relatively independent of the pre-treatment, the CO conversion activity of sample catalyst K1 through pre-treatment in reducing atmosphere is clearly increased, i.e., the temperature $T_{90}$, at which the conversion reaches 90%, sinks to 98° C. In FIG. 2, DRIFTS measurements (Diffuse Reflectance Infrared Fourier Transform Spectroscopy) of catalysts K1 and VK11 after adsorption of CO in the range of 3000-2600 $cm^{-1}$, which correspond to the formation of formate species on the surface, are shown. While no peaks form with either catalyst after oxidative pre-treatment (light curves), the spectra following reductive pre-treatment (dark curves) are very different. While no formate species were formed with comparative catalyst VK1 (only one peak at wavenumber 2906 $cm^{-1}$ is recognizable), the peaks at wavenumbers 2879 $cm^{-1}$ and 2847 $cm^{-1}$ show the presence of reactive centers for comparative catalyst 1.

In FIG. 3, the CO conversions of the inventive sample catalysts K2 and K3 are shown together with that of comparative catalyst VK2. Although all catalysts have a similar composition, differences in the conversion following reductive pre-treatment can be clearly seen. Thus, the $T_{90}$ values for K2 and K3 are 85° C. and 140° C., while the $T_{90}$ value for VK2 is 215° C. The corresponding DRIFTS spectra following reductive pre-treatment and CO adsorption are shown in FIG. 4. (The curves of the fresh samples are also still included here. These need to be removed.) While peaks in the range of wavenumbers 2906 $cm^{-1}$, 2879 $cm^{-1}$, and 2847 $cm^{-1}$ have clearly formed for the inventive catalysts K2 and K3, these are not recognizable in comparative catalyst VK2. It is thus critical to the inventive catalyst that the above-listed DRIFTS peaks be present following CO adsorption.

Figure 1:
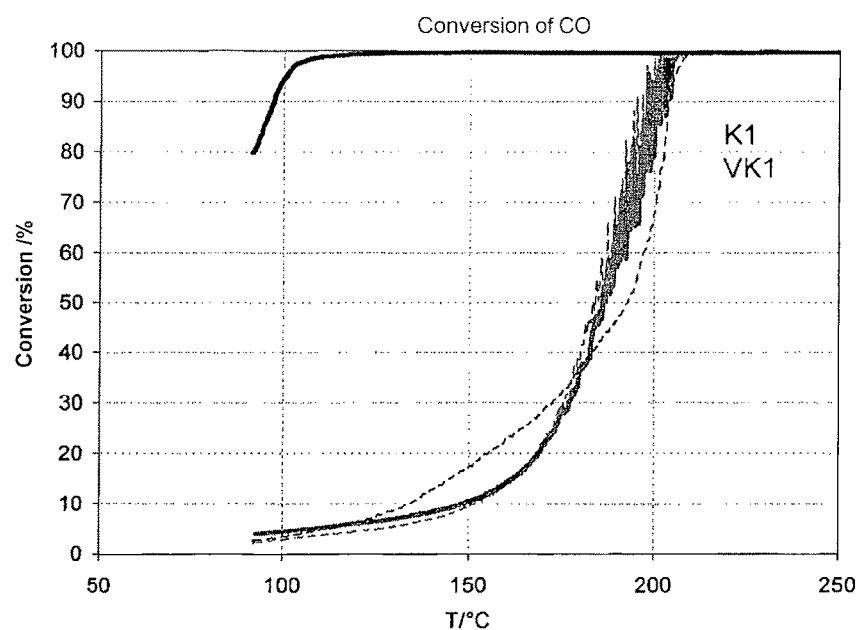
FIG. 1 shows the CO conversion of sample catalyst K1 and comparative catalyst VK1 as a function of the temperature after pre-treatment in oxidizing atmosphere.
Figure 2:
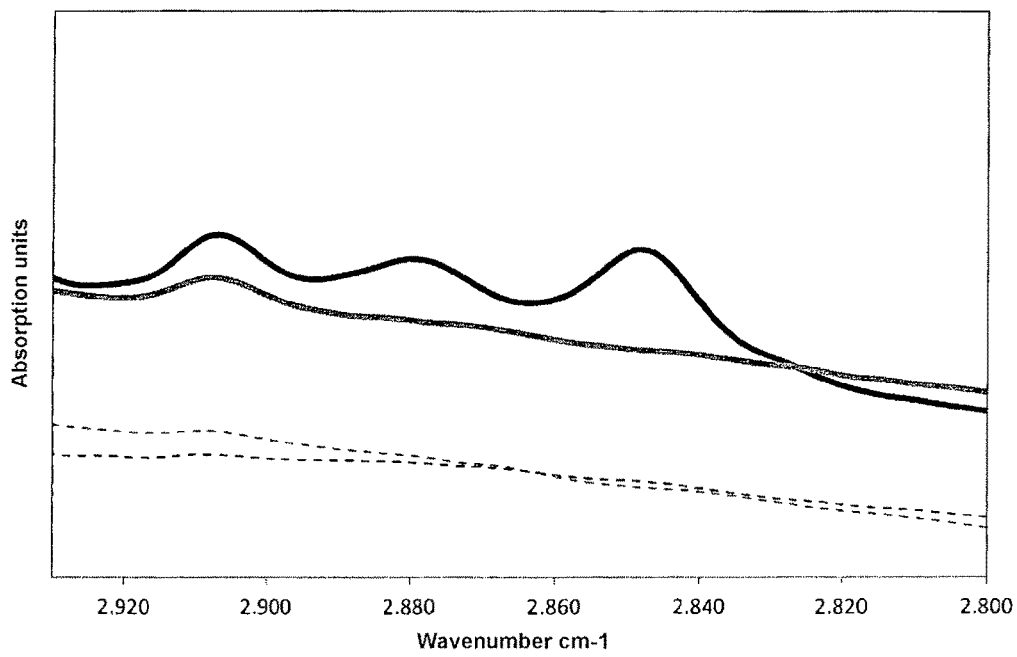
FIG. 2 shows DRIFTS measurements (Diffuse Reflectance Infrared Fourier Transform Spectroscopy) of catalysts K1 and VK11 after adsorption of CO in the range of 3000-2600 $cm^{-1}$.
Figure 3:
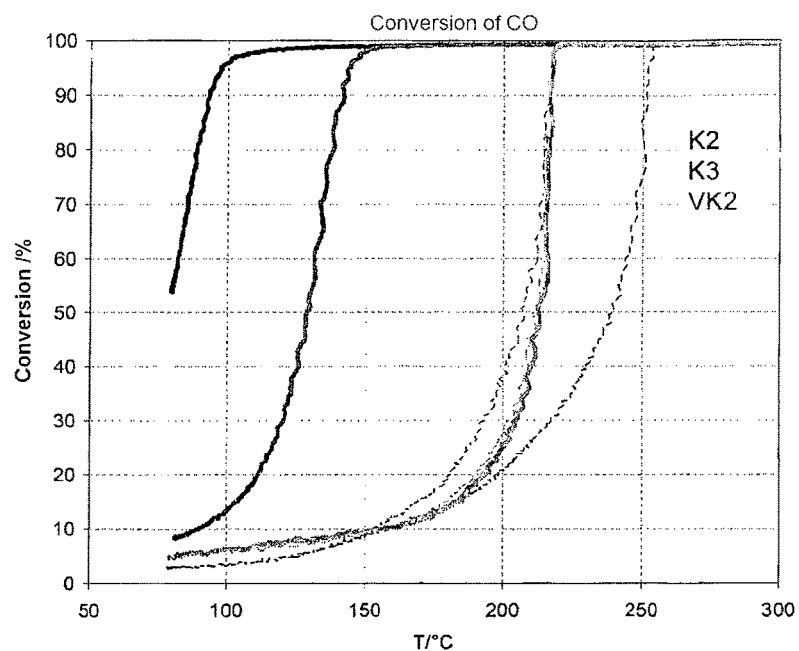
FIG. 3 shows the CO conversions of the inventive sample catalysts K2 and K3 shown together with that of comparative catalyst VK2.
Figure 4:
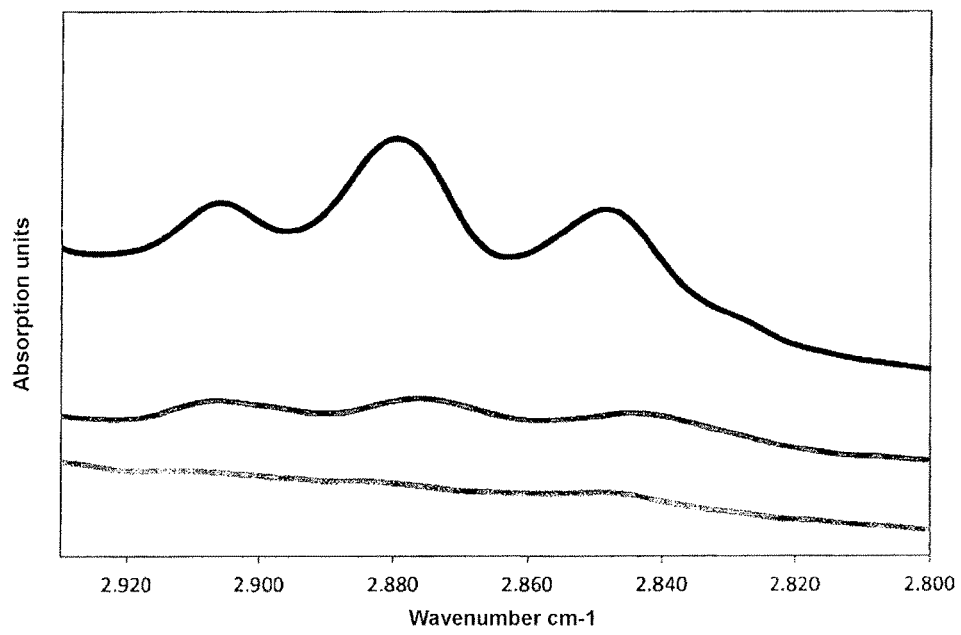
FIG. 4 shows corresponding DRIFTS spectra following reductive pre-treatment and CO adsorption.

The following table summarizes the results:

|     | Intensity at | | | Peak ratios | | CO conversion T90 [° C.] |
| --- | --- | --- | --- | --- | --- | --- |
|     | 2906$^{-1}$ | 2879$^{-1}$ | 2874$^{-1}$ | 2879/2906 | 2847/2906 | |
| K1  | 0.0191 | 0.0194 | 0.0292 | 1.0 | 1.5 | 98 |
| VK1 | 0.0078 | <0.005 | <0.005 | — | — | 200 |
| K2  | 0.0247 | 0.0571 | 0.0415 | 2.3 | 1.7 | 90 |
| K3  | 0.0084 | 0.0125 | 0.0111 | 1.5 | 1.3 | 140 |
| VK2 | <0.005 | <0.005 | <0.005 | — | — | 220 |

The invention claimed is:

1. A catalyst for removing carbon monoxide and hydrocarbon from the exhaust gas of lean-operated internal combustion engines on a supporting body, comprising
   (i) platinum, or platinum and palladium, on one or more refractory carrier material; and
   (ii) cerium oxide present in an amount of 50 to 150 g/L relative to the volume of the supporting body,
   wherein, after reductive treatment at 250° C. and after CO adsorption, the catalyst shows peaks at wavenumbers 2906 cm$^{-1}$ (5 cm$^{-1}$), 2879 cm$^{-1}$ (±5 cm$^{-1}$), and 2847 cm$^{-1}$ (±5 cm$^{-1}$) in Diffuse Reflectance Infrared Fourier Transform Spectroscopy (DRIFTS), and
   wherein a ratio of peak heights at wavenumber 2879 cm$^{-1}$ to wavenumber 2906 cm$^{-1}$ is greater than 0.4, and a ratio of peak heights at wavenumber 2847 cm$^{-1}$ to wavenumber 2906 cm$^{-1}$ is also greater than 0.4.

2. The catalyst according to claim 1, wherein the quantity of platinum, or platinum and palladium, is 0.5 to 10% by weight relative to component (i).

3. The catalyst according to claim 1, wherein the quantity of platinum, or platinum and palladium, is 1 to 5% by weight relative to component (i).

4. The catalyst according to claim 1, wherein the catalyst comprises platinum and palladium, and the weight ratio of Pt:Pd is 1:1 to 20:1.

5. The catalyst according to claim 1, wherein aluminum oxide, silicon oxide, magnesium oxide, titanium oxide, cerium oxide, zeolite, or mixtures or mixed oxides thereof are used as refractory carrier materials of component (i).

6. A method for removing carbon monoxide and hydrocarbon from the exhaust gas of lean-operated internal combustion engines, comprising passing the exhaust gas over a catalyst according to claim 1.

* * * * *